United States Patent
Breidenbach et al.

[11] Patent Number: 5,904,182
[45] Date of Patent: May 18, 1999

[54] METHODS AND APPARATUS FOR PROVIDING QUARTZ GLASS CONNECTORS

[75] Inventors: Poul E. Breidenbach, Bruchkobel; Heinz Herzog, Karlstein; Helmut Leber, Hanau; Jurgen Pottker, Bruchkobel, all of Germany

[73] Assignees: Heraeus Quarzglas GmbH, Hanau, Germany; Shin-Etsu Quartz Products, Co., Ltd., Tokyo, Japan

[21] Appl. No.: 08/543,110

[22] Filed: Oct. 13, 1995

[30] Foreign Application Priority Data

Oct. 14, 1994 [DE] Germany ............... 44 36 646

[51] Int. Cl.$^6$ ...................... F16L 9/10
[52] U.S. Cl. .............. 138/109; 138/141; 138/165
[58] Field of Search ............... 138/109, 112, 138/141, 165, 169, 144; 428/426; 285/405, 416, 911; 65/42, 54, 57; 215/40, 42; 220/646, 672

[56] References Cited

U.S. PATENT DOCUMENTS

| | | | |
|---|---|---|---|
| 3,246,671 | 4/1966 | Stein et al. | 138/109 |
| 3,715,197 | 2/1973 | Nalepka | 65/54 |
| 3,772,134 | 11/1973 | Rau | 138/141 |
| 3,776,809 | 12/1973 | Bäumler et al. | 138/141 |
| 3,860,043 | 1/1975 | Kutnyak et al. | 138/141 |
| 4,195,980 | 4/1980 | Sterling et al. | |
| 4,530,378 | 7/1985 | Boog et al. | 138/109 |
| 4,699,177 | 10/1987 | Thomas | 138/109 |
| 4,768,563 | 9/1988 | Kogge et al. | 138/109 |
| 5,158,589 | 10/1992 | Curtis et al. | 65/57 |
| 5,322,539 | 6/1994 | Mathisen et al. | |

FOREIGN PATENT DOCUMENTS

| | | |
|---|---|---|
| 0191023 B1 | 7/1988 | European Pat. Off. . |
| 78 20 880 | 4/1979 | Germany . |
| 627913 | 8/1949 | United Kingdom . |
| 644691 | 10/1950 | United Kingdom . |
| 2038310 | 7/1980 | United Kingdom . |

OTHER PUBLICATIONS

Product literature of Heraeus Quarzschmelze GmbH entitled "Heraeus–Quartz, Quartz Glass Products for Epitaxy," (PHL–B50E, E 3C 0.89/N Ku), Sep. 1989.

Japanese Utility Model Publication No. K–6865–4G, 8518–4G, 7454–5F, published Dec. 14, 1989.

*Primary Examiner*—Denise L. Ferensic
*Assistant Examiner*—James F. Hook
*Attorney, Agent, or Firm*—Workman, Nydegger & Seeley

[57] ABSTRACT

A preferred embodiment of the present invention comprises a vitreous quartz pipe or container having a connector including a flange formed from at least one strip or rod-shaped piece of transparent quartz glass which is wound circumferentially around either an inner or outer surface of a portion of the pipe or container and secured to the pipe or container to thereby form a closed-ring flange. The portion of the pipe or container having the attached flange may be an open end of the pipe or container or may be a wall portion where a connector for mounting to fixtures or other fittings may be desired. This type of strip or rod-shaped piece of quartz glass can be made via a conventional pulling technique such that a strip or rod having the appropriate uniform cross-sectional shape is obtained. The prepared strips or rod-shaped pieces are then easily cut with a saw device to appropriate lengths. According to a preferred method of the present invention, a small portion of a strip or rod-shaped piece of transparent quartz glass is made pliable with the direct application of heat. As the portion of the strip or rod-shaped piece of quartz glass becomes pliable, the strip or rod-shaped piece of quartz glass is made to conform to the curvature of the underlying inner or outer pipe or container surface.

14 Claims, 4 Drawing Sheets

METHODS AND APPARATUS FOR PROVIDING QUARTZ GLASS CONNECTORS

BACKGROUND OF THE INVENTION

1. Related Applications

A claim for priority of German Utility Model Application, P 44 36 649.9, filed Oct. 14, 1994, incorporated herein by reference, is made for this application.

2. The Field of the Invention

The present invention concerns methods and apparatus for providing a transparent quartz glass connector on a vitreous quartz pipe or container such as, for example, an epitaxy profiled tube or epitaxy bell jar. In particular, the present invention teaches methods of providing a closed-ring flange of transparent quartz glass on either an inner or outer surface of a portion of a vitreous quartz pipe or container.

3. The Relevant Technology

Quartz glass system components are used in a multitude of processing systems, including epitaxy and semiconductor processing. As exemplified by product literature such as Heraeus Quarzschmelze GmbH's *Heraeus-Quartz, Quartz Glass Products for Epitaxy* (PHL-B50E, E 3C 0.89/N Ku), which disclosure is incorporated herein by specific reference, pipes and containers for epitaxy, including profiled tubes and bell jars, having ring-shaped flanges made of transparent quartz glass are conventional. Pipes and containers of these types are generally manufactured from vitreous quartz. Depending on the desired application, the pipes and containers may be formed from either transparent or opaque quartz glass or may contain portions formed from one, and other portions formed from the other, of these materials. In some applications, these pipes and containers may be employed for treating electronic components at high temperatures in controlled atmospheres.

The openings of such pipes and containers are typically equipped with conventional connectors comprising flanges to thereby provide means for effecting a gas-tight seal between the pipe or container and the corresponding supply and connecting components of the processing system. Although the pipes and containers typically have a circular cross-section, it is also known to use pipes and containers having square, rectangular, hexagonal, elliptical, D-shaped, or other cross-section geometries, which also are equipped with connecting flanges. The flanges are usually cut out of transparent quartz glass plates and are then welded to the opening of the pipe or container. Japanese Utility Model Publication No. S55-52906, published Jan. 26, 1983, discloses depositing a transparent quartz glass flange over the axial face of an opaque quartz glass flange surrounding the opening of a quartz glass core pipe or bell jar. In this manner, an improved gas seal was achieved compared to the opaque quarts glass flange without the addition of the transparent quartz glass flange.

With respect to cutting flanges from transparent quartz glass plates, it will be appreciated that a certain amount of unavoidable scrap material peripheral to the cut-out portion must be expected. In addition, the central opening cut-out portion of the flange typically cannot be reused and, thus, represents wasted material as well. The cut-out flange usually must also be ground at least on the outer circumference surface corresponding to the outer diameter of the flange. Formation of the central opening of the flange is particularly difficult in the case of curved openings. Sawing plates are usually not suitable for cutting along the inner curvature and, thus, the openings must be formed by drilling or grinding processes. The cutting and grinding processes necessary to produce cut-out flanges require diamond-tipped saw blades and grinding disks which are not only expensive to obtain initially but generally have short service lives.

Based on the foregoing, it would be an advancement in the art to furnish methods and apparatus for providing a transparent quartz glass connector on a vitreous quartz pipe or container which minimize material waste.

It would be a further advancement in the art to furnish methods and apparatus for providing a transparent quartz glass connector on a vitreous quartz pipe or container which eliminate the need for cutting and grinding process steps.

Such methods and apparatus for providing a transparent quartz glass connector on a vitreous quartz pipe or container are disclosed and claimed herein.

SUMMARY AND OBJECTS OF THE INVENTION

It is an object of the present invention to furnish improved methods and apparatus for providing a transparent quartz glass connector on a vitreous quartz pipe or container. In particular, it is an object of the present invention to provide such methods and apparatus which minimize material waste and which eliminate the need for cutting and grinding process steps.

It is a further object of the present invention to furnish improved methods and apparatus for providing a transparent quartz glass connector on a vitreous quartz pipe or container which eliminates the need to separately cut and prepare connectors for variously-sized pipes and containers. Rather, according to the present method, the material to prepare the connectors need only be provided in continuous cast sections of strip or rod-shaped material which can easily be cut to correspond to variously-sized pipes and containers.

These and other objects of the present invention will become more fully apparent from the following description and appended claims, or may be learned by the practice of the invention as set forth hereinafter.

To achieve the foregoing objects, and in accordance with the invention as embodied and broadly described herein, a preferred embodiment of the present invention comprises a vitreous quartz pipe or container having a connector including a flange formed from at least one strip or rod-shaped piece of transparent quartz glass which is wound circumferentially around either an inner or outer surface of a portion of the pipe or container and secured to the pipe or container to thereby form a closed-ring flange. The portion of the pipe or container having the attached flange may be an open end of the pipe or container or may be a wall portion where a connector for mounting to fixtures or other fittings may be desired. The cross-sectional shape, i.e., dimensional thickness, of the at least one quartz glass strip or rod-shaped piece thus corresponds to the cross-section dimensions, i.e., the radial depth of the flange extending radially from the surface of the pipe or container and the axial length of the flange extending axially along the surface of the pipe or container. The flange is preferably of a uniform radial depth and axial length which will fittingly engage conforming connectors on other system components. This type of strip or rod-shaped piece of quartz glass can be made via a conventional pulling technique such that a strip or rod having the appropriate uniform cross-sectional shape is obtained. The prepared strips or rod-shaped pieces are then easily cut with a saw device to appropriate lengths.

According to a preferred method of the present invention, a small portion of a strip or rod-shaped piece of transparent quartz glass is made pliable with the direct application of heat. As the portion of the strip or rod-shaped piece of quartz glass becomes pliable, the strip or rod-shaped piece of quartz glass is made to conform to the curvature of the underlying inner or outer pipe or container surface. At the same time, heat is applied to the pipe or container surface and the facing underside of the strip or rod-shaped piece of quartz glass and light pressure forms a secure weld between the pipe or container surface and the strip or rod-shaped piece of quartz glass.

The strip or rod-shaped piece of quartz glass is preferably equal in length to a single or multiple circumference of the surface of the pipe or container which is being contacted. In addition, the strip or rod-shaped piece of quartz glass preferably has ends which are shaped to fittingly align with each other such that a smooth, essentially seamless, joint having a cross-sectional shape identical to that of the remainder of the strip or rod-shaped piece is formed at the point where the ends are radially aligned with each other. An example of a suitable end shape would be a tapered wedge shape wherein each end forms a tapered wedge which can be aligned and fitted to the other end to thereby describe the original cross-sectional shape of the strip or rod-shaped piece.

The above-described steps of heating a portion of the strip or rod-shaped piece of quartz glass, causing the pliable heated portion of the strip or rod-shaped piece of quartz glass to conform to the curvature of the underlying surface, and heating the surface and the facing underside of the strip or rod-shaped piece of quartz glass while applying light pressure to thereby secure the strip or rod-shaped piece of quartz glass to the underlying pipe or container surface are continuously repeated over the entire length of the strip or rod-shaped piece of quartz glass such that the strip or rod-shaped piece becomes wound, at least once, circumferentially around, and secured to, the pipe or container surface to thereby form a closed-ring flange having uniform cross-section dimensions.

An alternative preferred method comprises heating the entire length of the at least one strip or rod-shaped quartz glass piece until it becomes pliable enough to be wound around the circumference of the desired pipe or container surface. The properly positioned strip or rod-shaped quartz glass piece is then welded securely into place.

It is preferred to use relatively thin strips or rod-shaped pieces which are easily shaped when slightly heated. To achieve a flange having a radial depth greater than the corresponding dimensional thickness of a single prepared strip or rod-shaped piece of quartz glass, multiple layers of the strip or rod-shaped piece of quartz glass may be applied one upon the other extending radially from the surface of the pipe or container. The multiple layers may comprise single layer strips or rod-shaped pieces of quartz glass applied, separately, one upon the other. Alternatively, the multiple layers may comprise a single strip or rod-shaped piece of quartz glass of sufficient length to be coiled upon itself in a continuous manner such that the desired number of layers are obtained. The multiple layers of quartz glass strips or rod-shaped pieces are then preferably fused or welded to each other by application of heat and the surface is ground to create a flat sealing surface on the flange.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which is illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
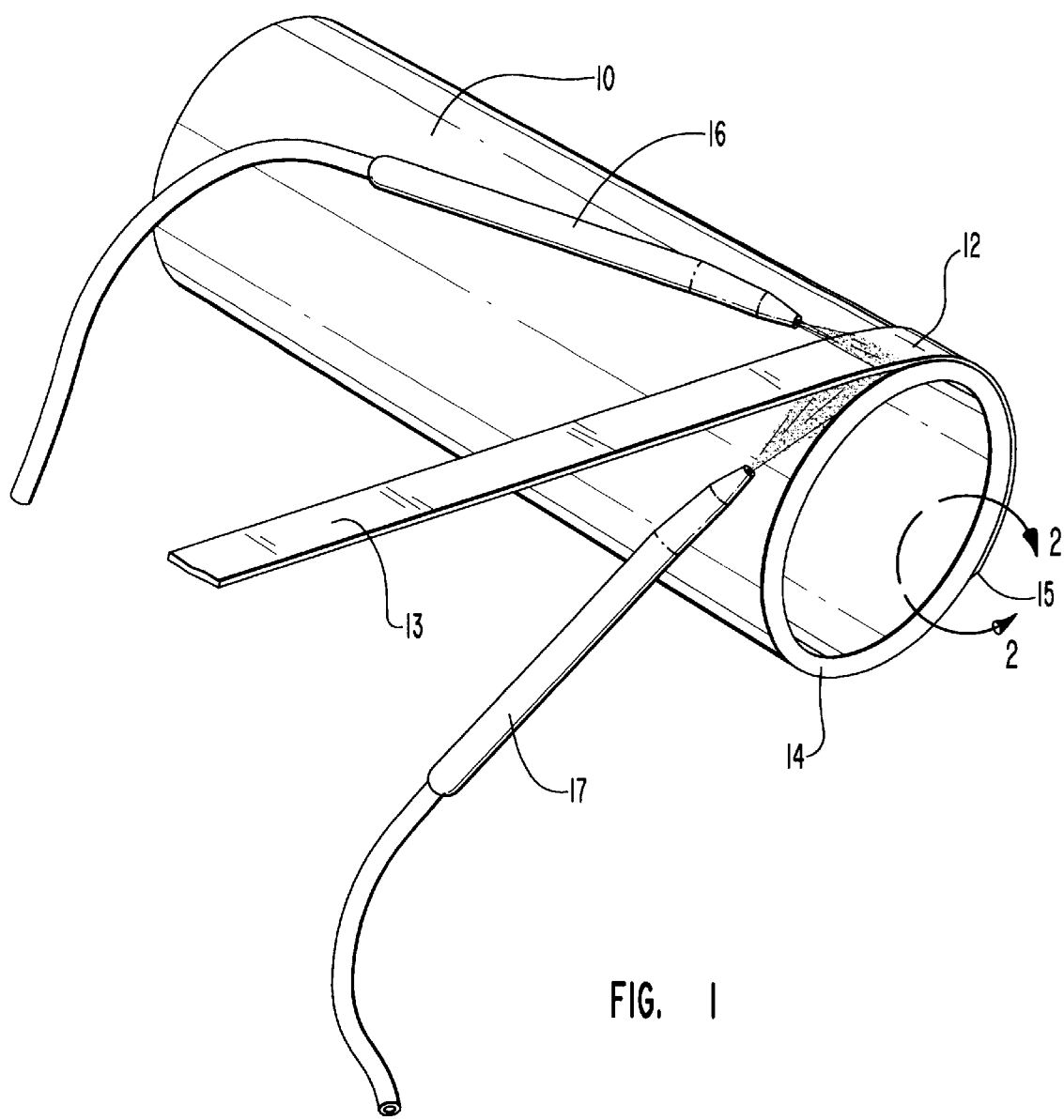
FIG. 1 is a perspective view of a pipe having a flange formed around the outer surface of the opening in accord with a preferred method of the present invention.
Figure 2:
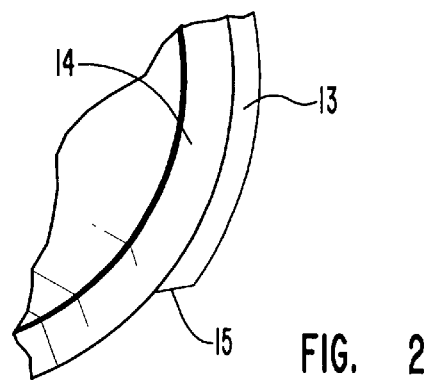
FIG. 2 is an exploded cut-away view taken from within circle 2 in FIG. 1.

Quartz glass system components are used in a multitude of processing systems, including epitaxy and semiconductor processing. Pipes and containers of these types are generally manufactured from vitreous quartz. Depending on the desired application, the pipes and containers may be formed from either transparent or opaque quartz glass or may contain portions formed from one, and other portions formed from the other, of these materials. Examples of pipes and containers for epitaxy include profiled tubes and bell jars. The pipes and containers are typically equipped with connectors comprising ring-shaped flanges made of transparent quartz glass to permit gas-tight connections to be made with other system components. Connectors may also be used to provide means for mounting the pipes or containers to fixtures or other fittings. Accordingly, the portion of the pipe or container having the attached flange may be an open end of the pipe or container or may be a wall portion where a connector for mounting to fixtures or other fittings may be desired.

The present invention concerns methods and apparatus for providing a transparent quartz glass connector on a vitreous quartz pipe or container such as, for example, an epitaxy profiled tube or epitaxy bell jar. In particular, the present invention teaches methods of providing a closed-ring flange of transparent quartz glass on either an inner or outer surface of a portion of a vitreous quartz pipe or container. A preferred embodiment of the present invention comprises a vitreous quartz pipe or container having a connector including a flange formed from at least one strip or rod-shaped piece of transparent quartz glass which is wound circumferentially around either an inner or outer surface of a portion of the pipe or container and secured to the pipe or container to thereby form a closed-ring flange. The cross-sectional shape, i.e., dimensional thickness, of the at least one quartz glass strip or rod-shaped piece thus corresponds to the cross-section dimensions, i.e., the radial depth of the flange extending radially from the surface of the pipe or container and the axial length of the flange extending axially along the surface of the pipe or container. The flange is preferably of a uniform radial depth and axial length which will fittingly engage conforming connectors on other system components.

This type of strip or rod-shaped piece of quartz glass can be made via a conventional pulling technique such that a strip or rod having the appropriate uniform cross-sectional shape is obtained. The prepared strips or rod-shaped pieces are then easily cut with a saw device to appropriate lengths for any size pipe or container. Compared to conventional methods and apparatus which involve cutting and grinding appropriately-sized flanges from plates or sheets of quartz glass material and welding the flanges to pipes or containers, the methods and apparatus of the present invention minimize material waste and eliminate the need for cutting and grinding process steps. In addition, the methods and apparatus of the present invention eliminate the need to separately cut and prepare connectors for variously-sized pipes and containers. It has been discovered that the methods and apparatus of the present invention are more simple and practical while being comparable in cost to conventional methods involving the welding, to vitreous quarts pipes and containers, of pre-cut flanges prepared in appropriate sizes.

FIG. 1 illustrates a pipe 10 of transparent quartz glass. In accord with a preferred method of the present invention, a flange 12 is being applied to the pipe by winding a strip 13 of transparent quartz glass circumferentially around the outer surface of the opening of the pipe. As shown in FIG. 1, the flange 12 may be positioned to be flush with the edge 14 of the pipe opening. As illustrated, the strip 13 is heated by first burner 16 such that the strip becomes pliable and can be made to conform to the curvature of the outer surface of the pipe 10 as the pipe is turned on its axis. At the same time, the pipe surface, as well as the facing side of strip 13 can be heated with second burner 17 so that these surfaces will fuse to each other under lightly applied pressure.

To ensure a flange 12 having uniform dimensions, the strip 13 has a length equal to the circumference of the outer surface of the pipe, or some multiple thereof, and has ends which are shaped to fittingly align with each other such that a smooth, essentially seamless, joint having a cross-sectional shape identical to that of the remainder of the strip is formed at the point where the ends are radially aligned with each other. As seen best in the exploded cut-away view of the first end 15 of the strip 13 taken from within circle 2 in FIG. 1, a suitable end shape would be a tapered wedge shape. As seen best in FIGS. 3 and 4, the second end 19 of the strip 13 comprises an inverse tapered wedge shape such that the first and second ends can be aligned and fitted to each other to thereby describe the original cross-sectional shape of the strip.

It will be appreciated that a flange 12 having a radial depth equal to the corresponding dimensional thickness of one strip 13 requires a strip having a length equal to one circumference of the pipe 10. The above-described steps of heating a portion of the strip, causing the pliable heated portion of the strip to conform to the curvature of the pipe surface, heating the surface and the facing underside of the strip, and applying light pressure to thereby secure the strip to the pipe surface are continuously repeated over the entire length of the strip to thereby form a closed-ring flange having uniform cross-section dimensions.

An alternative preferred method comprises heating the entire length of the strip or rod-shaped quartz glass piece until it becomes pliable enough to be wound around the circumference of the desired pipe or container surface. The properly positioned strip or rod-shaped quartz glass piece is then welded securely into place.

It is preferred to use relatively thin strips or rod-shaped pieces of transparent quartz glass material which are easily shaped when slightly heated. The strips or rods can be pre-manufactured and provided in standard cross-sectional shapes. These strips or rods can be easily heated to the appropriate deformation temperature and then wrapped circumferentially around the inner or outer surface of a quartz glass pipe or container at any desired position. A deformation temperature for quartz glass strips or rods in accord with the present invention within the range of 1,700° C. to 2,100° C. is sufficient to permit the strips or rods to be appropriately deformed yet substantially retain their original cross-sectional shape. With this process, it has been shown that these types of strips or rods can be wound circumferentially around the inside or outside surfaces of portions of pipes or containers having circular cross-sections. It has also been shown that these types of strips or rods can be wound circumferentially around the inside or outside surfaces of portions of pipes or containers having other cross-sectional shapes, such as square, hexagonal, or others, in which the corner sections exhibit a very small radius of curvature. It has been discovered that the strip or rod of quartz glass must be heated slightly more to permit deformation corresponding to these small curvature radii.

To achieve a flange 12 having a radial depth greater than the corresponding dimensional thickness of a single prepared strip or rod-shaped piece of quartz glass, multiple layers of the strip or rod-shaped piece of quartz glass may be applied one upon the other extending radially from the surface of the pipe or container. The multiple layers of quartz glass strips or rod-shaped pieces are then preferably fused or welded to each other by application of heat and the surface is ground to create a flat sealing surface on the flange.

Figure 3:
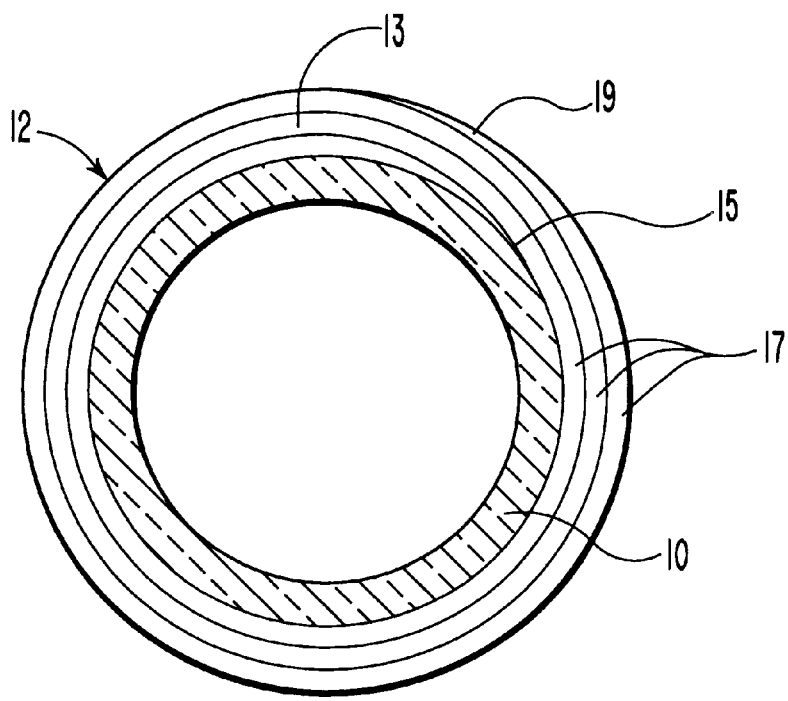
FIG. 3 is a cross-section view of the open end of a pipe having a flange around the outer surface in accord with a preferred embodiment of the present invention.

As illustrated in FIG. 3, the multiple layers 17 may comprise a single strip 13 of quartz glass of sufficient length to be coiled upon itself in a continuous manner such that the desired number of layers, stacked one upon the other, are obtained. For example, as shown in FIG. 3, a strip 13 having a length equal to three circumferences of pipe 10 may be used to form a flange 12 having a radial depth which is three layers 17 deep. First end 15 of strip 13 preferably has a tapered wedge shape and second end 19 of strip 13 has a corresponding inverse tapered wedge shape such that the first and second ends, when aligned with each other as shown, thereby describe the original cross-sectional shape of the strip.

Figure 4:
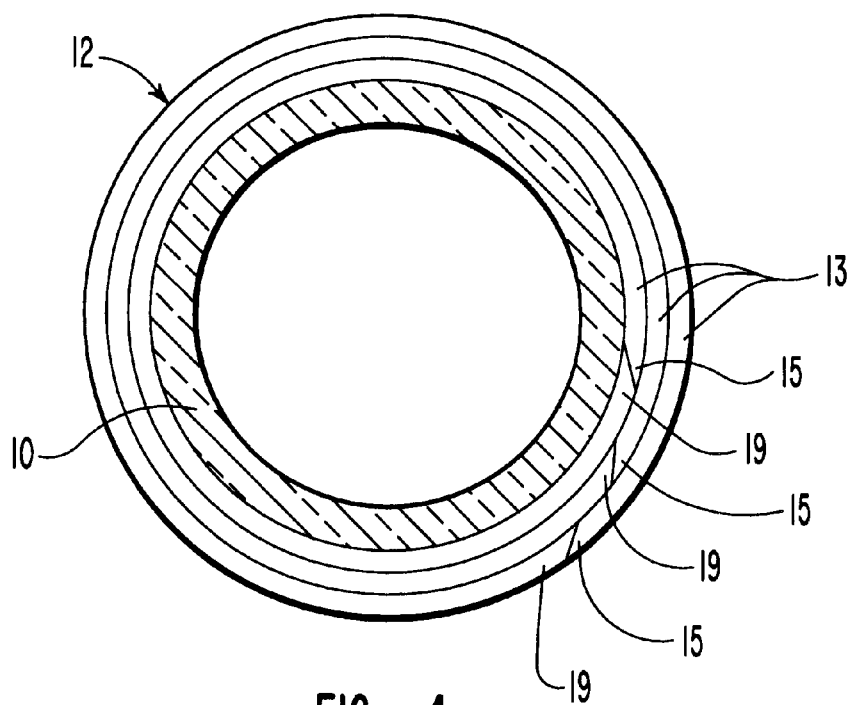
FIG. 4 is a cross-section view of the open end of a pipe having a flange around the outer surface in accord with another preferred embodiment of the present invention.

Alternatively, as illustrated in FIG. 4, a flange 12 having a radial depth greater than the corresponding dimensional thickness of a single prepared strip or rod-shaped piece of quartz glass may be achieved with separate single layer strips or rod-shaped pieces of quartz glass stacked one upon the other. The single layers are welded on in succession in accord with the methods of the present invention. For example, as shown in FIG. 4, three separate strips 13, each having a length equal to one circumferences of pipe 10 may be used to form a flange 12 having a radial depth which is three layers deep. First end 15 of each strip 13 preferably has a tapered wedge shape and second end 19 of each strip 13 has a corresponding inverse tapered wedge shape such that the first and second ends, when aligned with each other as shown, thereby describe the original cross-sectional shape of the strip.

Figure 5:
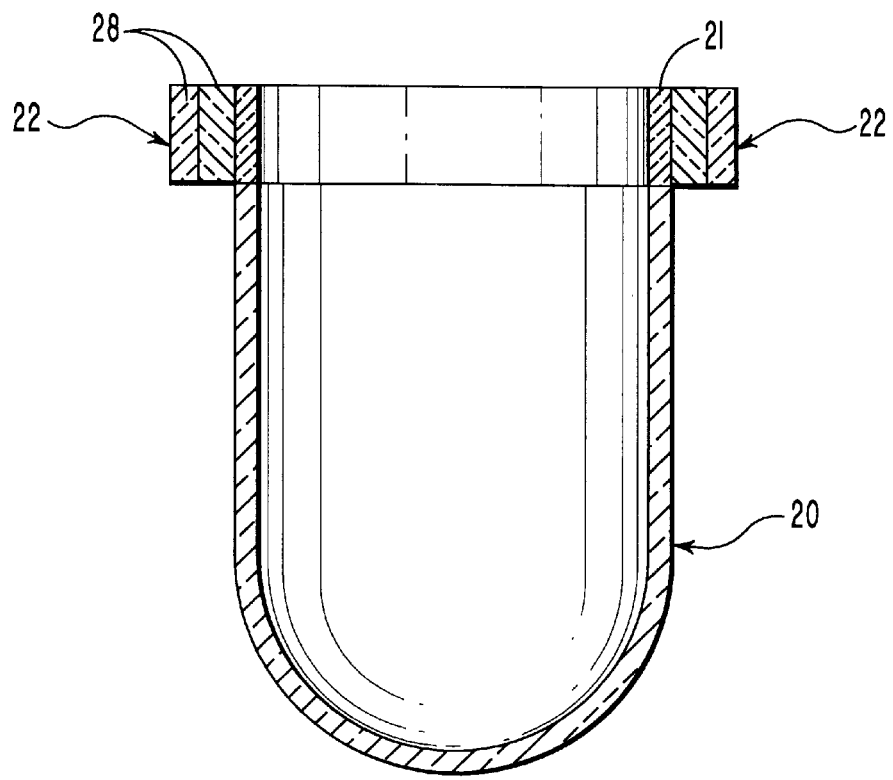
FIG. 5 is a cross-section view of a side of a container having a flange around the outer surface of the opening in accord with a preferred embodiment of the present invention.
Figure 6:
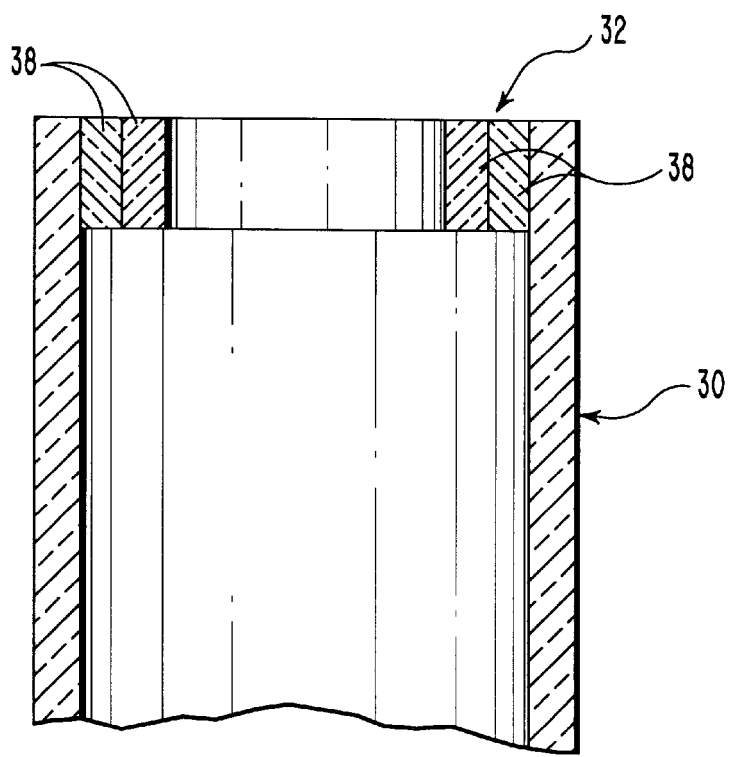
FIG. 6 is a cross-section view of a side of a pipe portion having a flange around the inner surface of the opening in accord with a preferred embodiment of the present invention.
Figure 7:
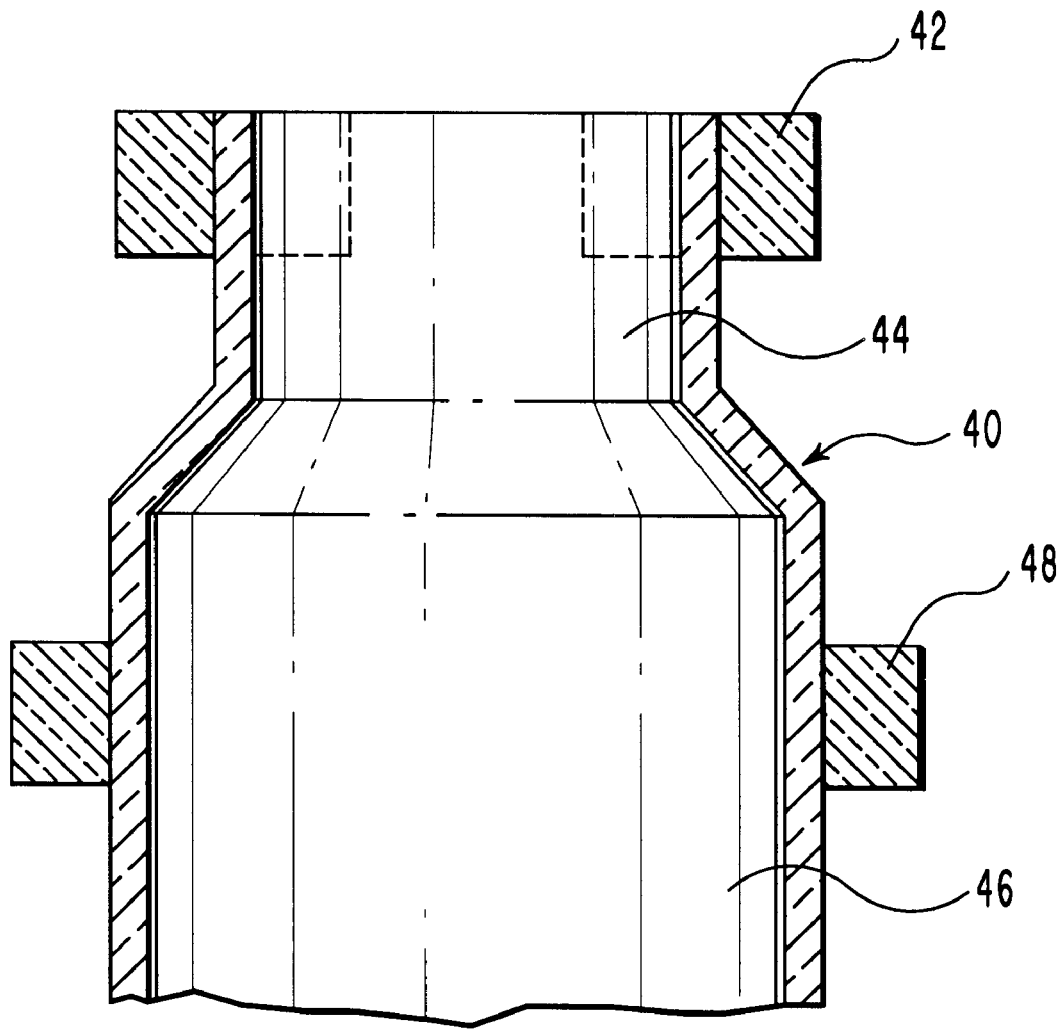
FIG. 7 is a cross-section view of a side of a pipe portion having a first flange around the outer surface of the opening and a second flange around the outer surface of a wall portion in accord with a preferred embodiment of the present invention.

Exemplary preferred embodiments of pipes or containers having connectors comprising flanges in accord with the present invention are illustrated in FIGS. 5 through 7. FIG. 5 illustrates a side view cross-section of an epitaxy bell jar 20 having a flange 22 around the outside of the open end. As shown, the flange 22 may comprise two layers 28 of transparent quartz glass wound around the circumference of the outer surface of bell jar 20 and positioned to be flush with the edge of the open end. It will be appreciated that a single layer or more than two layers of a strip or rod-shaped piece of transparent quartz glass could be used, if desired. As illustrated, bell jar 20 may preferably comprise a section 21 comprising opaque pipe material in the area where the flange is attached while the remainder of the bell jar 20 comprises transparent quartz glass.

FIG. 6 illustrates a side view cross-section of a portion of a quartz glass pipe 30 having a flange 32 around the inside of the open end. As shown, the flange 32 may comprise two layers 38 wound around the circumference of the inner surface of the pipe 30 and positioned to be flush with the edge of the open end. It will be appreciated that a single layer or more than two layers of a strip or rod-shaped piece of transparent quartz glass could be used, if desired.

FIG. 7 illustrates a side view cross-section of a portion of a graduated pipe 40 having an open end 44 with a smaller diameter than the remaining wall portion 46. A first flange 42 is positioned around the outside of the open end 44. As indicated by the dotted lines, it will be appreciated that a flange could also be made to fit the circumference of the inner surface of a desired portion of the pipe 40, such as the open end 44. A second flange 48 is positioned around the outside of the wall portion 46. As shown, first flange 42 and second flange 48 comprise strips of transparent quartz glass material having identical cross-section dimensions. Accordingly, both flanges could be made from a prepared strip or rod of transparent quartz glass pulled according to conventional methods to maintain a uniform cross-sectional shape, i.e., dimensional thickness, and having a length sufficient to provide a strip or rod which can be cut into at least a first strip having a length corresponding to the circumference of the open end 44 of pipe 40 and a second strip having a length corresponding to the circumference of the wall portion 46 of pipe 40. Such prepared strips or rods are preferably formed in pre-manufactured continuous cast sections. The first and second ends of the cut strips can be cut into corresponding tapered wedge shapes such that, when the ends are aligned with each other, the original cross-sectional shape of the strip is obtained. In this manner, flanges of varying sizes are easily produced from pre-manufactured strips or rods of pulled quartz glass.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A connector for vitreous quartz pipes or containers comprising:

a flange formed from at least one strip of quartz glass wound circumferentially around a surface portion of said pipe or container and secured to said surface portion to thereby form a closed-ring, said at least one strip of quartz glass being formed with a first end, a mid-portion, and a second end, said first and second ends being shaped in a corresponding manner wherein said ends can be fittingly aligned with one another to form a joint having a cross-section dimension identical to said mid-portion.

2. A connector as described in claim 1 wherein said surface portion is an inside surface of said pipe or container.

3. A connector as described in claim 1 wherein said surface portion is an outside surface of said pipe or container.

4. A connector as described in claim 2 wherein said surface portion is at an open end of said pipe or container.

5. A connector as described in claim 3 wherein said surface portion is at an open end of said pipe or container.

6. A connector as described in claim 4 wherein said flange is positioned flush with an edge of said open end.

7. A connector as described in claim 5 wherein said flange is positioned flush with an edge of said open end.

8. A connector as described in claim 1 wherein said flange is formed from at least one strip of quartz glass coiled upon itself to form multiple stacked layers extending radially from said surface portion of said pipe or container.

9. A connector as described in claim 1 wherein said flange is formed from multiple strips of quartz glass wherein said strips are applied in succession to form multiple stacked layers extending radially from the said surface portion of said pipe or container.

10. A connector as described in claim 1 wherein said flange comprises uniform cross-section dimensions.

11. A connector as described in claim 1 wherein said first and second ends are shaped as corresponding tapered wedge shapes.

12. A connector as described in claim 1 wherein said flange is formed from a continuous cast strip of quartz glass.

13. A connector for vitreous quartz pipes or containers comprising:

a flange formed from at least one strip of quartz glass wound circumferentially around a surface portion of said pipe or container and secured to said surface portion, said at least one strip of quartz glass being formed with a first end and an opposing second end, said first and second ends being butted together to form a joint.

14. A connector as described in claim 13 wherein said first and second ends are shaped as corresponding tapered wedge shapes.

* * * * *

UNITED STATES PATENT AND TRADEMARK OFFICE
CERTIFICATE OF CORRECTION

PATENT NO. : 5,904,182

DATED : May 18, 1999

INVENTOR(S) : Breidenbach et al.

It is certified that error appears in the above-identified patent and that said Letters Patent are hereby corrected as shown below:

Col. 1, line 55, before "glass" change "quarts" to --quartz--

Col. 4, line 2, after "which" change "is" to --are--

Col. 5, line 30, after "vitreous" change "quarts" to --quartz--

Signed and Sealed this

Eighth Day of February, 2000

*Attest:*

*Attesting Officer*

Q. TODD DICKINSON

*Commissioner of Patents and Trademarks*